United States Patent
Lee et al.

(10) Patent No.: US 7,242,834 B2
(45) Date of Patent: Jul. 10, 2007

(54) DISPERSION-SHIFTED FIBER FOR OPTICAL PARAMETRIC AMPLIFIER

(75) Inventors: Won Kyoung Lee, Daejeon (KR); Heuk Park, Daejeon (KR); Hyun Jae Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 138 days.

(21) Appl. No.: 10/903,056

(22) Filed: Jul. 30, 2004

(65) Prior Publication Data

US 2005/0111802 A1 May 26, 2005

(30) Foreign Application Priority Data

Nov. 22, 2003 (KR) ............... 10-2003-0083359

(51) Int. Cl.
*G02B 6/02* (2006.01)
*G02B 6/00* (2006.01)

(52) U.S. Cl. .................. 385/123; 385/126; 385/144
(58) Field of Classification Search ............. 385/123, 385/126, 144
See application file for complete search history.

(56) References Cited

U.S. PATENT DOCUMENTS

| 5,148,510 | A | 9/1992 | Borrelli et al. | |
|---|---|---|---|---|
| 6,243,522 | B1 | 6/2001 | Allan et al. | |
| 6,256,440 | B1 * | 7/2001 | Kato et al. | 385/123 |
| 6,424,775 | B1 | 7/2002 | Paillot et al. | |
| 6,535,676 | B1 * | 3/2003 | de Montmorillon et al. | 385/123 |
| 6,546,177 | B1 * | 4/2003 | Matsuo et al. | 385/123 |
| 6,755,447 | B2 * | 6/2004 | Galle et al. | 285/390 |
| 2004/0095635 | A1 * | 5/2004 | Kakui | 359/334 |
| 2004/0125434 | A1 * | 7/2004 | Kumar et al. | 359/330 |

FOREIGN PATENT DOCUMENTS

KR 2002-0037294 5/2002

OTHER PUBLICATIONS

"Design of Highly Nonlinear Dispersion Shifted Fiber for Optical Parametric Amplifier", W. Lee, et al., Phototonics Conference 203, Nov. 12-14, 2003.
"Laser-diode-driven ultrafast all-optical switching by using highly nonlinear chalcogenide glass fiber", M. Asobe, et al., 1993 Optical society of America, pp. 1056-1058.
Thursday Afternoon / OFC 2002, pp. 567-568.
Korean Intellectual Property Office (Notice To Submitt Response), Nov. 28, 2005.

* cited by examiner

*Primary Examiner*—Kaveh Kianni
(74) *Attorney, Agent, or Firm*—Blakely Sokoloff Taylor & Zafman

(57) ABSTRACT

Provided is a dispersion-shifted fiber for an optical parametric amplifier. The dispersion-shifted fiber is a silica-based optical fiber and has a large nonlinear coefficient and a small effective area. The dispersion-shifted fiber also reduces a bending loss and a splice loss due to a mode field diameter difference between it and a conventional single mode fiber. For this, the dispersion-shifted fiber comprises a rectangular core with a very small radius and a high refractive index, a depressed inner clad, and an outer clad with a ring. The core and/or the inner clad are/is doped with a heavy metal.

10 Claims, 20 Drawing Sheets

DISPERSION-SHIFTED FIBER FOR OPTICAL PARAMETRIC AMPLIFIER

BACKGROUND OF THE INVENTION

This application claims priority from Korean Patent Application No. 2003-83359, filed on Nov. 22, 2003, in the Korean Intellectual Property Office, the disclosure of which is incorporated herein in its entirety by reference.

1. Field of the Invention

The present invention relates to a dispersion-shifted optical fiber for an optical parametric amplifier.

2. Description of the Related Art

As the application fields of optical parametric amplifiers (OPAs) are broadened, interest and research on the OPAs are increasing. The OPAs can amplify in all wavelength regions using an optical fiber as a gain medium and have wide gain bandwidth. Furthermore, the OPAs have a low noise figure and a high conversion efficiency because an input signal at a frequency $\omega_s$ and an idler signal, which is generated at the frequency $\omega_i = 2\omega_p - \omega_s$ by four-wave mixing (FWM) in a nonlinear medium, can simultaneously be amplified by only one pump signal at a frequency $\omega_p$. Therefore, the OPAs can be used not only as S- and U-band amplifiers but also as wavelength converters, switches, and signal processing.

To maximize the FWM efficiency and to enhance the performance of such OPAs, a pump with an output of 2 watt or more and an optical fiber with nonlinear coefficient as high as 20 $W^-km^{-1}$ or more are required. At an early stage, a conventional dispersion-shifted fiber (DSF) was used as nonlinear gain medium for the OPA.

The conventional dispersion-shifted fiber was designed to minimize the transmission loss and the dispersion slope for long-haul lightwave system. Therefore, the conventional dispersion-shifted fiber has a low loss but its nonlinear coefficient is as very low as 2 $W^-km^{-1}$. Furthermore, dispersion-shifted fibers have been developed toward broadening an effective area and decreasing a bending loss.

As shown in FIGS. 1A, 1B, and 2, dispersion-shifted fibers with wide effective area were designed to have a graded or trapezoidal refractive index core (U.S. Pat. No. 6,535,676B1, filed by Louis-Anne de Montmorillon, titled "Optical Fiber with Optimized Ratio of Effective Area to Dispersion Scope for Optical Transmission System with Wavelength Multiplexing", and published on Mar. 18, 2003) and/or a dual clad (U.S. Pat. No. 6,546,177 B1, filed by Shoichiro Matsuo, titled "Dispersion Shifted Optical Fiber", and published on Apr. 8, 2003). In particular, FIG. 2 shows a refractive index profile of a dispersion-shifted fiber with a ring in an outer clad to decrease a bending loss (U.S. Pat. No. 6,424,775 B1, filed by Mariamme Paillot, titled "Single Mode Dispersion-Shifted Optical Fiber Comprising an External Refractive Index Ring", and published on Jul. 23, 2002).

In recent years, it has been reported that heavy metals such as lead and bismuth increase the nonlinear refractive index of optical fibers (M. Asobe, et al., "Laser-diode-driven ultrafast all-optical switching by using highly nonlinear charcogenide glass fiber", Opt. Lett., 18, 1056–1058 (1993)).

U.S. Pat. No. 5,148,510, filed by Nicholas F. Borrelli, et al., titled "Optical fiber made of galliobismuthate glasses and optical devices using the same" discloses that the susceptibility of heavy metal oxide glasses is directly proportional to the concentration of heavy metals. A photonic crystal fiber (PCF) has been actively studied as a highly nonlinear fiber (U.S. Pat. No. 6,243,522 B1, filed by Douglas Clippinger Allan, et al., titled "Photonic crystal fiber", and published on Jun. 5, 2001). The PCF is made by inserting a plurality of glass capillaries into a glass tube, which enables sufficient reduction of an effective area.

In view of these advantages, the PCF has been used for an OPA. However, the PCF has disadvantages such as large loss and laborious splicing problem between it and a normal silica optical fiber. Unlike a manufacturing process of a normal silica optical fiber that includes deposition by chemical reactions of various materials such as $SiCl_4$, an exposure of the capillaries to an outer environment in a manufacturing process of the PCF is indispensable due to the stacking of capillaries. For this reason, impurities may be introduced into the capillaries during the exposure of the capillaries to an outer environment and then a loss of the PCF is increased. Furthermore, several air voids present on a cross-section of the PCF induces a large refractive index difference between the PCF and a normal silica optical fiber, which renders the splicing between the PCF and the silica optical fiber difficult.

SUMMARY OF THE INVENTION

The present invention provides a silica-based, dispersion-shifted fiber suitable for an optical parametric amplifier, which has a large nonlinear coefficient and a small effective area.

The present invention also provides a dispersion-shifted fiber for an optical parametric amplifier, which can reduce a bending loss and a splice loss due to a mode field diameter difference between it and a conventional single mode fiber (SMF).

The present invention also provides a silica-based, dispersion-shifted fiber which has a higher nonlinear coefficient and a smaller dispersion slope than those of a conventional dispersion-shifted fiber, and has an appropriate zero-dispersion wavelength for wide gain bandwidth.

According to an aspect of the present invention, there is provided a dispersion-shifted fiber for an optical parametric amplifier, which comprises a rectangular refractive index core, a depressed inner clad surrounding the core, and an outer clad, and has a nonlinear coefficient of 80 $W^-km^{-1}$ or more, an effective area of 10.5 $\mu m^2$ or less, and a zero-dispersion wavelength between 1580 and 1600 nm.

The outer clad of the optical fiber may comprise a ring.

The core and the inner clad may be doped with a heavy metal selected from bismuth (Bi), lead (Pb), and a mixture thereof to increase the nonlinearity of the optical fiber.

According to another aspect of the present invention, there is provided a dispersion-shifted fiber for an optical parametric amplifier, which has a nonlinear coefficient of 80 $W^-km^{-1}$ or more, an effective area of 10 to 30 $\mu m^2$, a dispersion slope of 0.014 $ps/nm^2/km$ or less, and a zero-dispersion wavelength between 1530 and 1620 nm.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
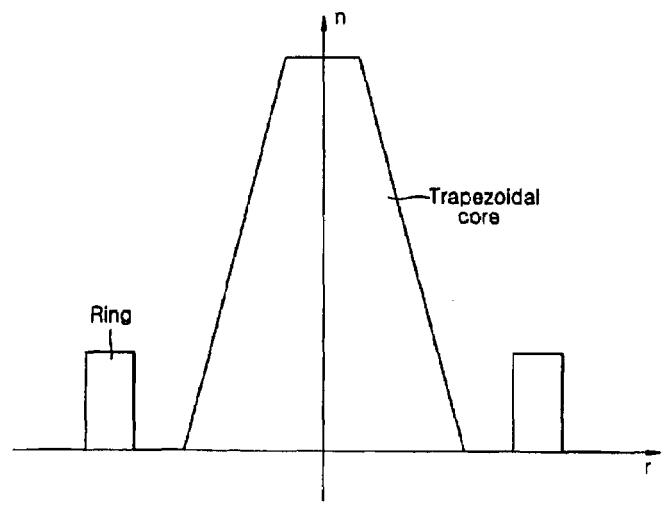
FIG. 1A is a refractive index profile of a dispersion-shifted fiber having a trapezoidal core and a ring.
Figure 1B:
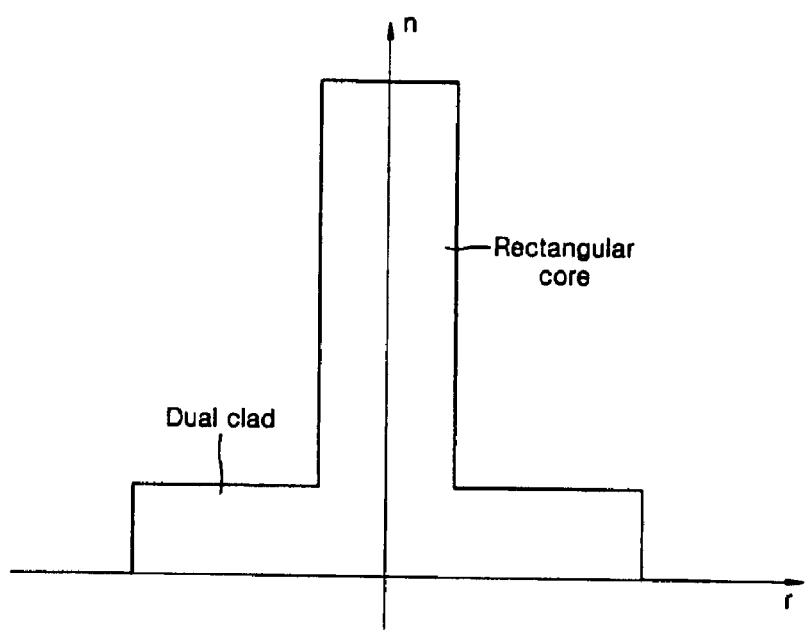
FIG. 1B is a refractive index profile of a dispersion-shifted fiber having a rectangular core and a dual clad.
Figure 2:
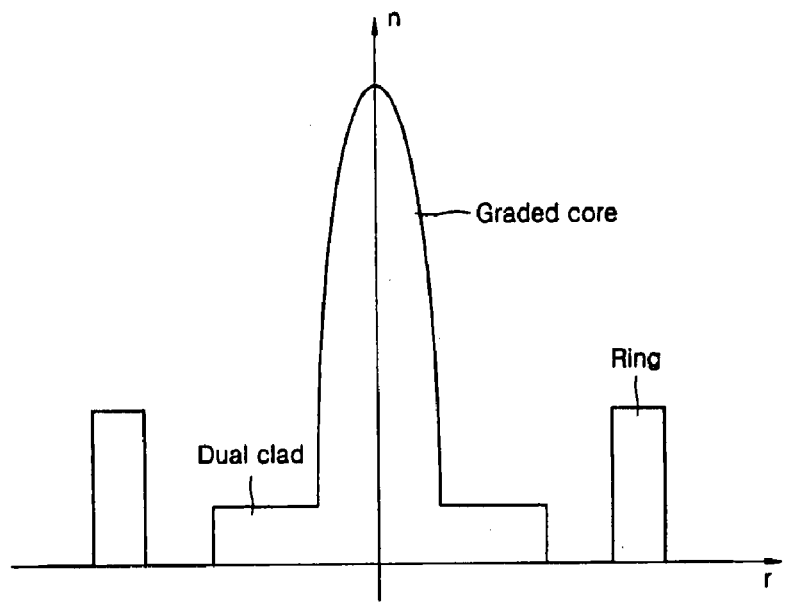
FIG. 2 is a refractive index profile of a dispersion-shifted fiber having a graded core, a dual clad, and a ring.

Hereinafter, construction and operation of the present invention will be described in detail with reference to the accompanying drawings in which exemplary embodiments of the invention are shown. The same reference numerals refer to the same constitutional elements throughout the drawings. When needed, a reference may be made to constitutional elements of a figure to describe another figure.

Figure 4:
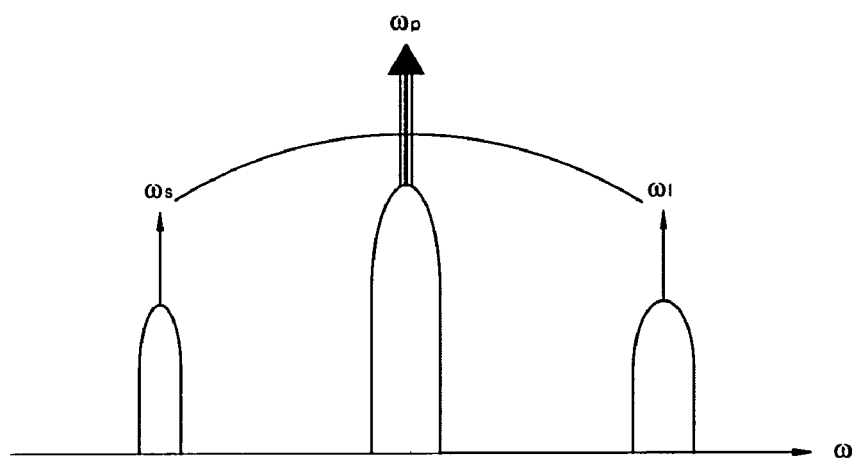
FIG. 4 is a view that illustrates a four wave mixing (FWM) process as amplification mechanism of a parametric amplifier.

An optical parametric amplifier (OPA) amplifies an input signal using four wave mixing (FWM) in an optical fiber. As shown in FIG. 4, when a pump wavelength is chosen to coincide with the zero-dispersion wavelength of the optical fiber, a signal at a frequency $\omega_s$ and phase-conjugated signal at the frequency $\omega_i=2\omega_p-\omega_s$, which is generated through the FWM process in a nonlinear medium, are amplified.

Figure 3:
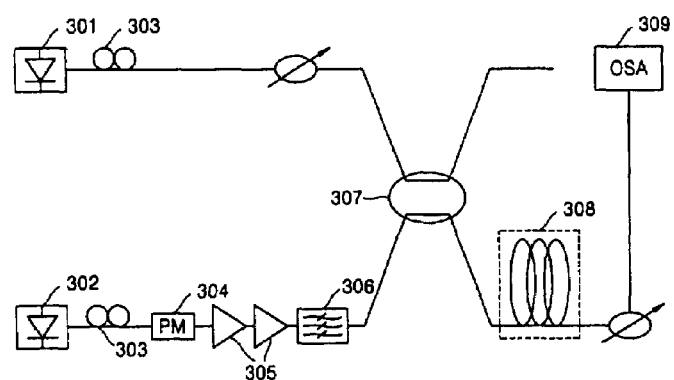
FIG. 3 is the configuration diagram of a conventional parametric amplifier.

A fundamental structure of such an OPA is illustrated in FIG. 3. A signal at the wavelength of 1557.6 nm from an optical source 301 is polarized in parallel to a pump signal at the wavelength of 1560.9 nm from an excitation pump laser 302 by a polarization controller 303. The pump signal from the excitation pump laser 302 has a wide pulse width through a phase modulator 304 and is amplified by two erbium-doped fiber amplifiers 305. An amplified spontaneous emission (ASE) noise of the amplified pump signal is removed by a tunable filter 306. The signal from the optical source 301 and the pump signal from the excitation pump laser 302 are combined by an optical coupler 307. The combined signal is amplified by FWM process in an optical fiber 308 used as a nonlinear medium. A reference numeral 309 indicates an optical spectrum analyzer.

To increase a signal gain, a high output power of pump LD and high nonlinearity of an optical fiber used as an amplification medium are required. At the same time, a zero-dispersion wavelength and a dispersion slope must be optimized. A conventional dispersion-shifted fiber has a low nonlinear coefficient, and thus, contributes to poor performance of an OPA.

In view of performance enhancement of an OPA, the present invention provides an optimal optical fiber structure for an OPA, taking into account nonlinearities, dispersion characteristics, losses, etc. of various optical fiber structures. An optimal optical fiber for an OPA must satisfy the following requirements.

(a) High nonlinear coefficient: an optical fiber must have a high nonlinear coefficient. The nonlinear coefficient ($\gamma$) is functions of wavelength, nonlinear refractive index ($n_2$), and effective area ($A_{eff}$), as presented in the following Equation 1. To increase the nonlinear coefficient at arbitrary wavelength, increase of the nonlinear refractive index or decrease of the effective area is required. A conventional dispersion-shifted fiber has a nonlinear coefficient of 2 $W^{-}km^{-1}$. It has been reported that the small effective area, together with high Ge doping into the core, enhances the nonlinear coefficient up to 20 $W^{-}km^{-1}$ in highly nonlinear DSFs.

$$\gamma = \frac{2\pi}{\lambda} \frac{n_2}{A_{eff}} \quad (1)$$

(b) Single mode at wavelength range used: an optical fiber must have single mode at C-band and L-band. A cut-off wavelength near to 1,300 nm, which is the cut-off wavelength of a conventional single mode fiber, is required.

(c) Zero-dispersion wavelength: to maximize the FWM efficiency, the phase-matching condition $\kappa_c=2\kappa_p-\kappa_s$ must be satisfied. Therefore, the zero-dispersion wavelength of the fiber should be chosen to coincide with the pump wavelength. According to the present invention, 1,590 nm, which is the center between the C-band and the L-band, is set as a zero-dispersion wavelength to have a gain bandwidth in both the C-band and the L-band.

(d) Dispersion slope: to efficiently induce a nonlinear phenomenon called FWM, a dispersion slope must be small. A conventional dispersion-shifted fiber has a dispersion slope of 0.08 $ps/nm^2/km$. A smaller dispersion slope is preferred.

(e) Low loss: to maximize the gain of an OPA, the loss of an optical fiber must be low. At this time, all losses including a scattering loss, a bending loss, and a splice loss due to a mode field diameter difference must be considered.

To design an optical fiber satisfying the requirements of (a) through (e), effects of various optical fiber structures on the requirements will now be described.

Figure 5:
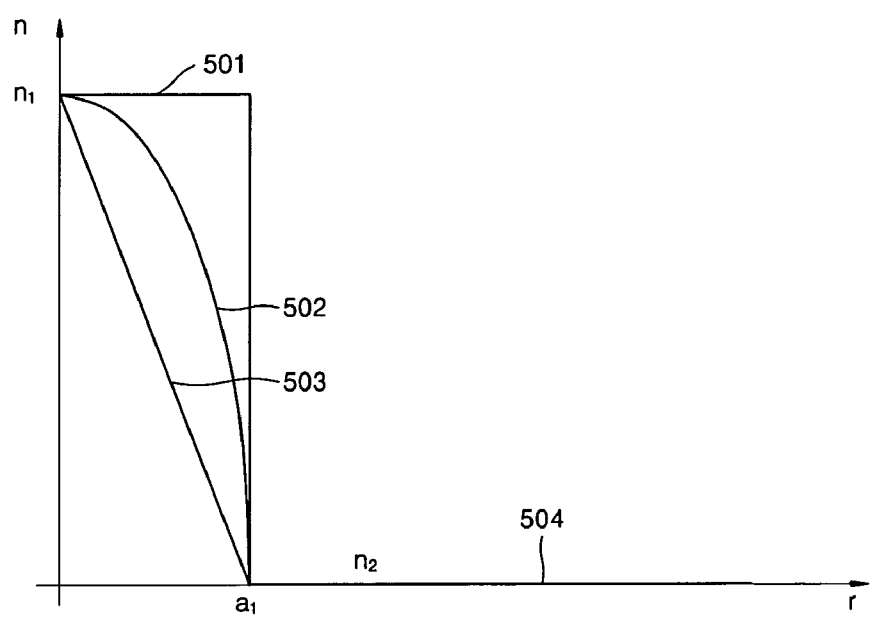
FIG. 5 is refractive index profiles of rectangular-, graded-, and triangular-core optical fibers.

FIG. 5 shows refractive index profiles of optical fibers having a rectangular core 501, a graded core 502, and a triangular core 503. Based on the refractive index profiles, effective refractive indices, field intensities, and effective areas are calculated. Here, a reference numeral 504 indicates a matched clad having a silica refractive index ($n_2$).

Figure 6:
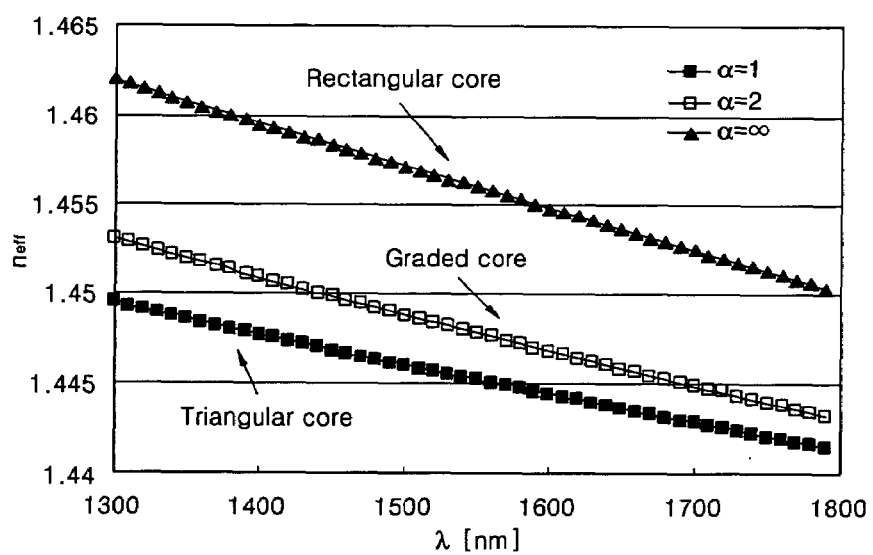
FIG. 6 is a graph that illustrates effective refractive index as a function of wavelength for the rectangular-, graded-, and triangular-core optical fibers of FIG. 5.
Figure 7:
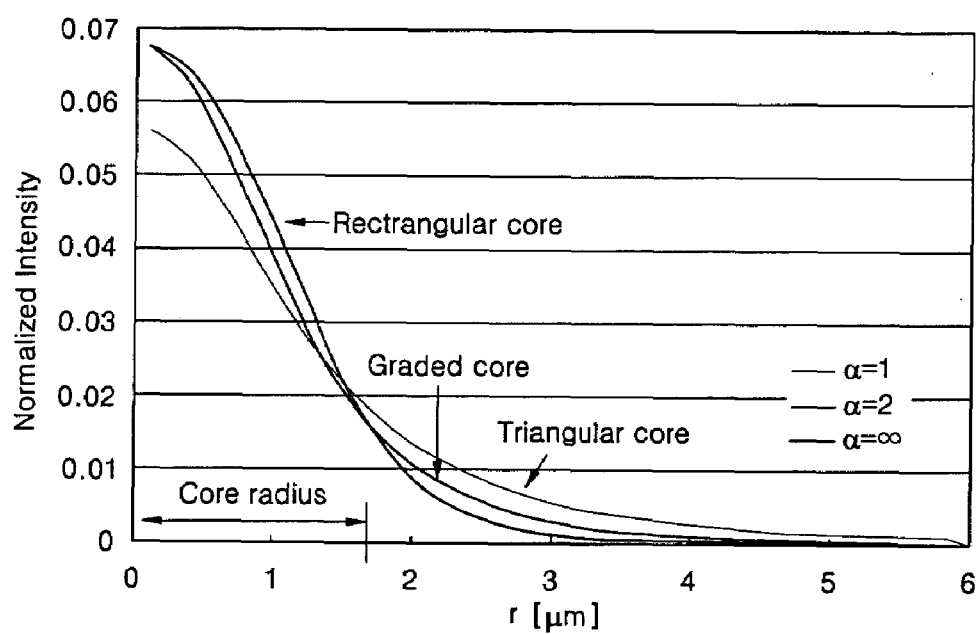
FIG. 7 is a graph that illustrates field intensity as a function of fiber radius for the rectangular-, graded-, and triangular-core optical fibers of FIG. 5.

FIG. 6 is a graph that illustrates effective refractive index as a function of the wavelength for the rectangular, graded, and triangular core optical fibers of FIG. 5. And FIG. 7 is a graph that illustrates field intensity as a function of the radius of the rectangular, graded, and triangular core optical fibers of FIG. 5.

Referring to FIG. 6, the optical fiber with a rectangular core exhibits the highest effective refractive index ($n_{eff}$). Since the refractive index difference between the effective refractive index and a clad in the rectangular core optical fiber is the largest of all, the light energy propagated in the optical fiber is the most concentrated on the core without being spread out on the clad. Therefore, the rectangular core has the highest field intensity and the smallest effective area as shown in FIG. 7. In this regard, for the purpose of the present invention, a rectangular refractive index core is preferred.

Figure 8:
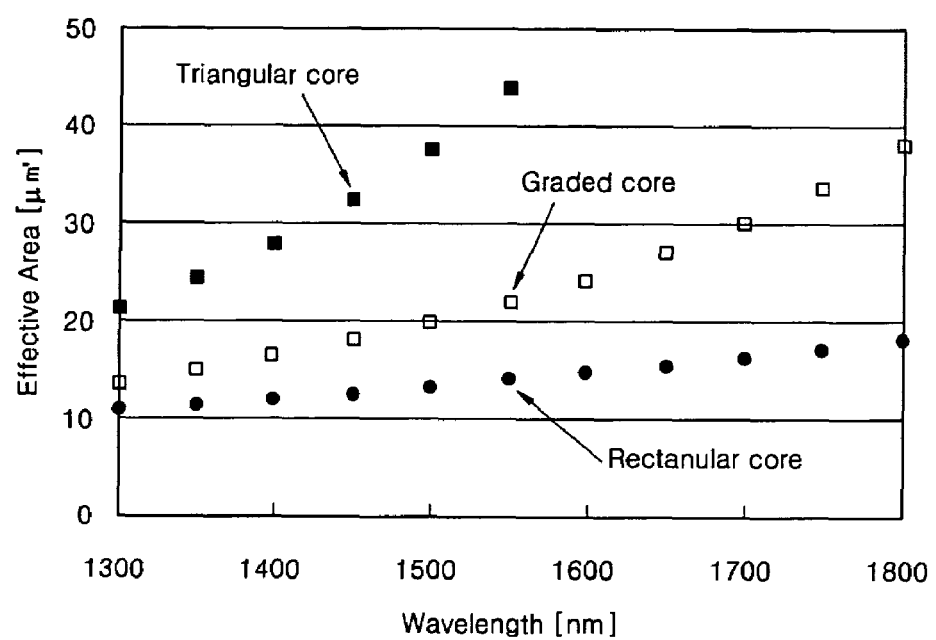
FIG. 8 is a graph that illustrates effective area as a function of wavelength for the rectangular-, graded-, and triangular-core optical fibers of FIG. 5.

A comparison of the effective areas in the rectangular, graded, and triangular core optical fibers of FIG. 5 is illustrated in FIG. 8.

Referring to FIG. 8, the rectangular core exhibits an effective area ($A_{eff}$) of 15.3 $\mu m^2$, the graded core optical fiber 21.85 $\mu m^2$, and the triangular core optical fiber 43.8 $\mu m^2$ at the wavelength of 1,550 nm. Here, a core radius is 1.65 $\mu m$ and a relative refractive index difference ($\Delta=(n_1-n_2)/n_1$) between a core and a clad is 2%. For the purpose of the present invention, a smaller effective area, i.e., a higher nonlinear coefficient, is preferred. In this regard, a rectangular core is preferred.

Figure 9A:
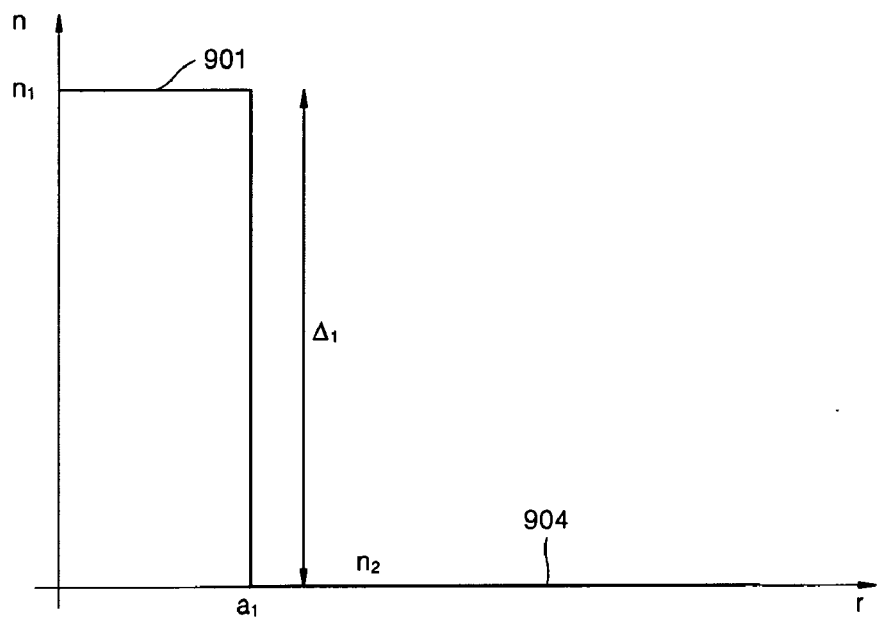
FIG. 9A is a refractive index profile of a rectangular core and matched clad optical fiber.
Figure 9B:
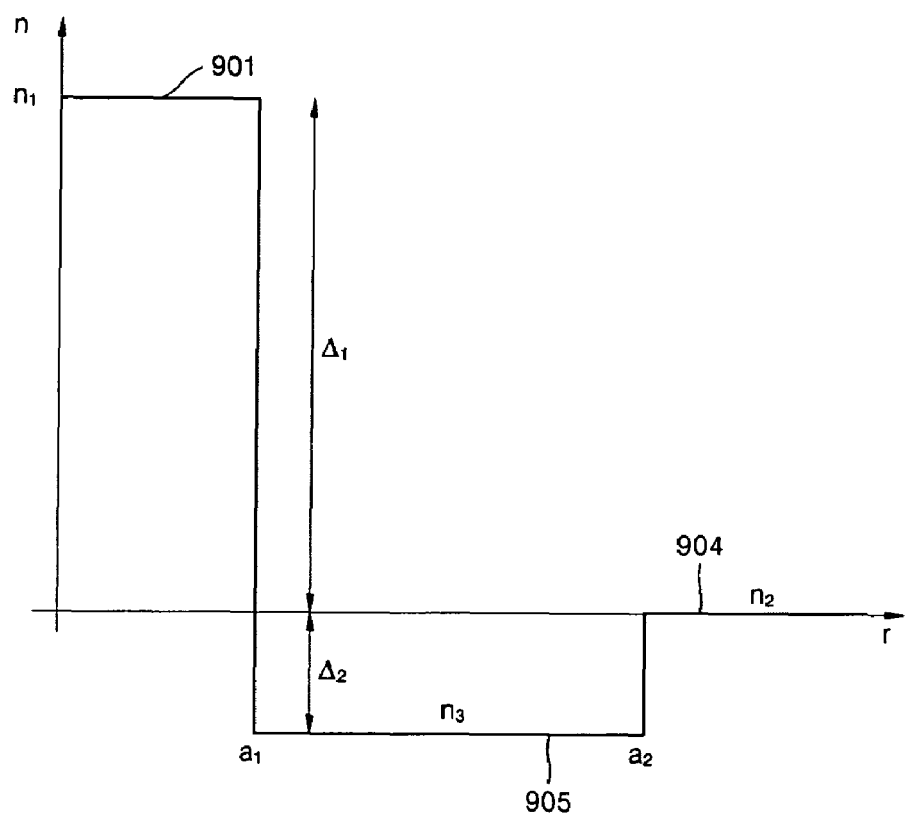
FIG. 9B is a refractive index profile of a rectangular core and depressed clad optical fiber.
Figure 9C:
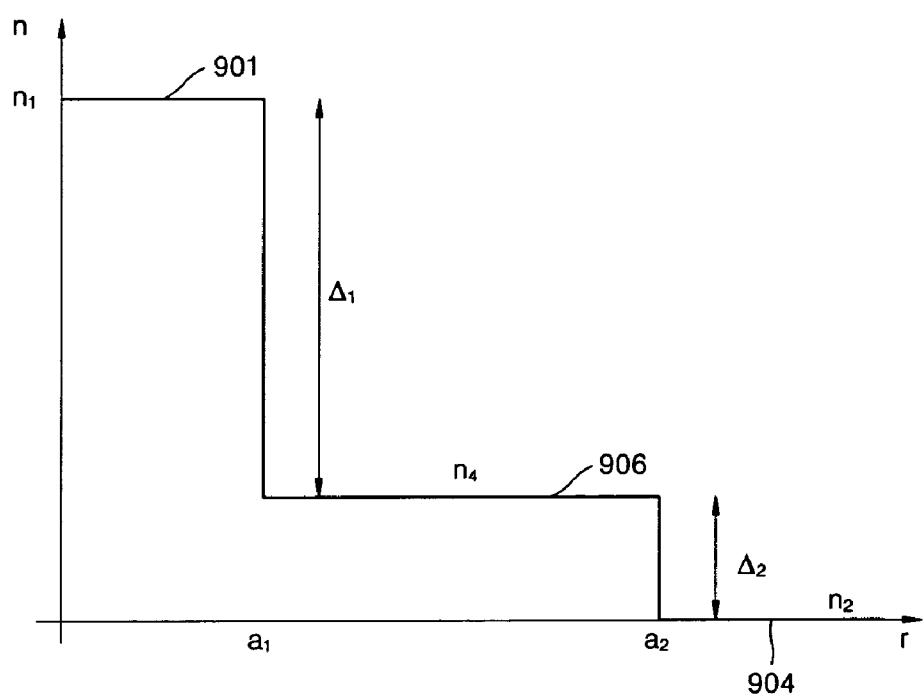
FIG. 9C is a refractive index profile of a rectangular core and dual clad optical fiber.

Aside from the refractive index profile of a core, the refractive index profile of a clad also has a significant effect on dispersion and effective area. As shown in FIGS. 9A through 9C, the refractive index of a clad may be the same as a silica refractive index (matched clad, FIG. 9A), lower than the silica refractive index (depressed clad, FIG. 9B), and higher than the silica refractive index (dual clad, FIG. 9C).

A relative refractive index difference ($\Delta_1$) between a core 901 and a matched clad 904 having a silica refractive index ($n_2$) is 2% and a relative refractive index difference ($\Delta_2$) between a depressed clad 905 or a dual clad 906 and the matched clad 904 having the silica refractive index ($n_2$) is 1.2%. Here, a core radius is 1.65 $\mu m$ and a clad radius is 12 $\mu m$.

Figure 10:
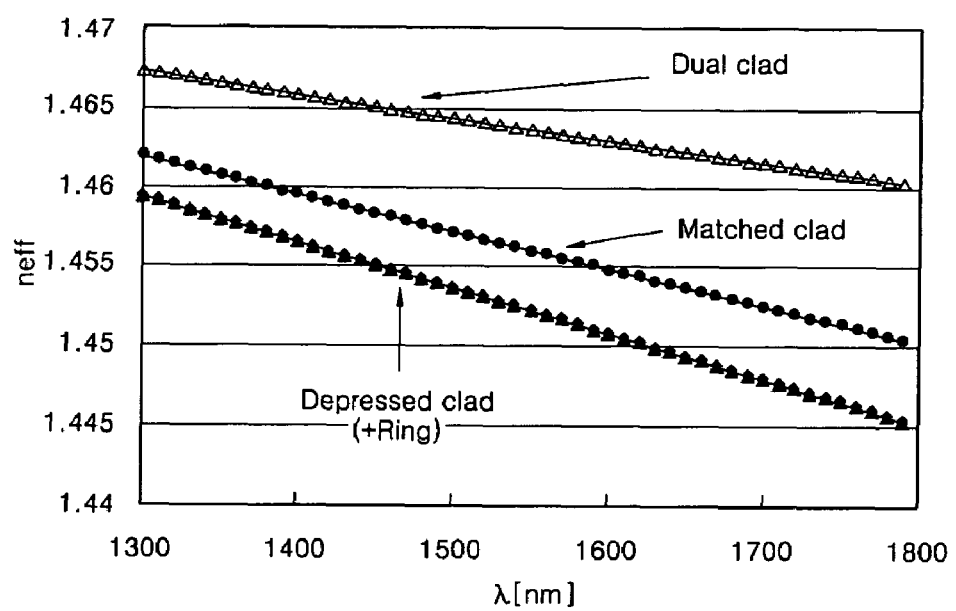
FIG. 10 is a graph that illustrates effective refractive index as a function of wavelength for the matched-, depressed-, and dual-clad optical fibers of FIGS. 9A through 9C.
Figure 11:
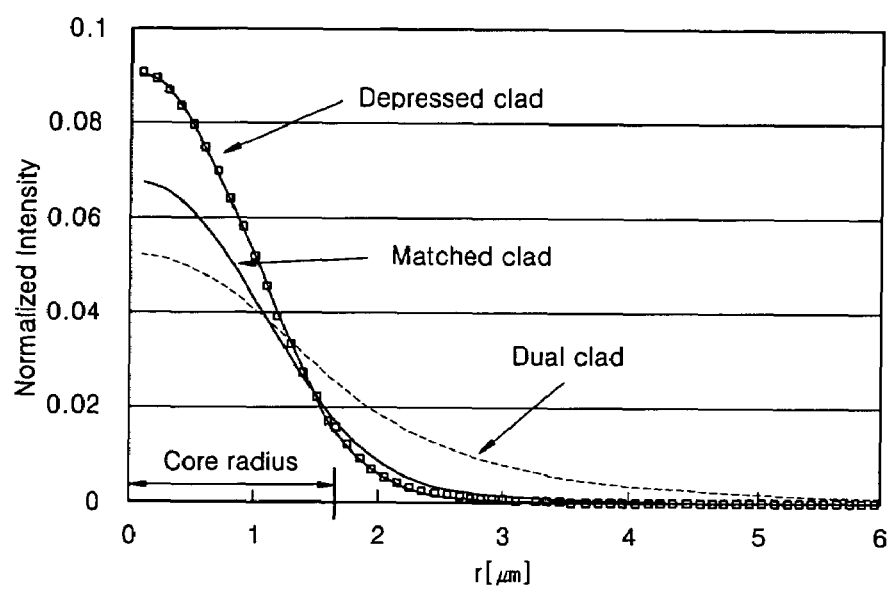
FIG. 11 is a graph that illustrates field intensity as a function of fiber radius for the matched-, depressed-, and dual-clad optical fibers of FIGS. 9A through 9C.

FIG. 10 is a graph that illustrates effective refractive index as a function of the wavelength for the matched-, depressed-, and dual-clad optical fibers of FIGS. 9A through 9C. And FIG. 11 is a graph that illustrates field intensity as a function of the fiber radius for the matched-, depressed-, and dual-clad optical fibers of FIGS. 9A through 9C.

Referring to FIG. 10, the optical fiber with depressed clad exhibits the lowest effective refractive index ($n_{eff}$). The optical fiber with dual clad exhibits the highest effective refractive index. However, with respect to the difference between the effective refractive index and the refractive index of a clad, the depressed clad is maximal and the dual clad is minimal. Therefore, a depressed clad structure is the most efficient in terms of the concentration of a light energy on a core.

Figure 12:
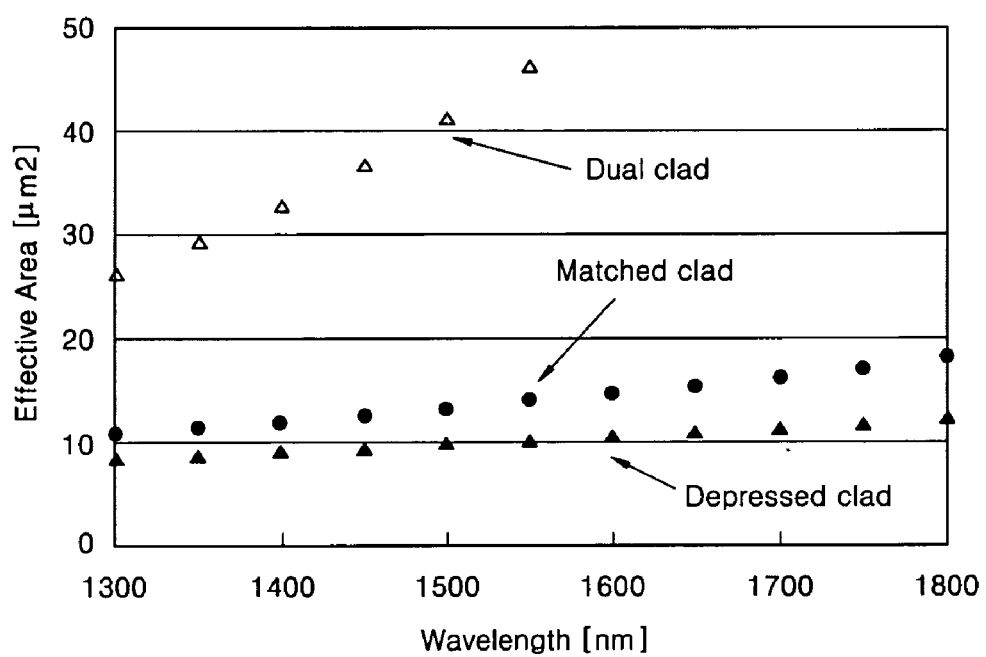
FIG. 12 is a graph that illustrates effective area as a function of wavelength for the matched-, depressed-, and dual-clad optical fibers of FIGS. 9A through 9C.

FIG. 12 is a graph that illustrates effective area as a function of the wavelength for the matched-, depressed-, and dual-clad optical fibers of FIGS. 9A through 9C.

Referring to FIG. 12, the optical fiber with depressed clad exhibits the smallest effective area and the optical fiber with dual clad exhibits the largest effective area. The optical fiber with matched clad has an effective area of 15.3 $\mu m^2$, that with depressed clad 10.2 $\mu m^2$, and that with dual clad 46.33 $\mu m^2$ at the wavelength of 1,550 nm. In this regard, an optical fiber of the present invention has a depressed clad structure.

Figure 13:
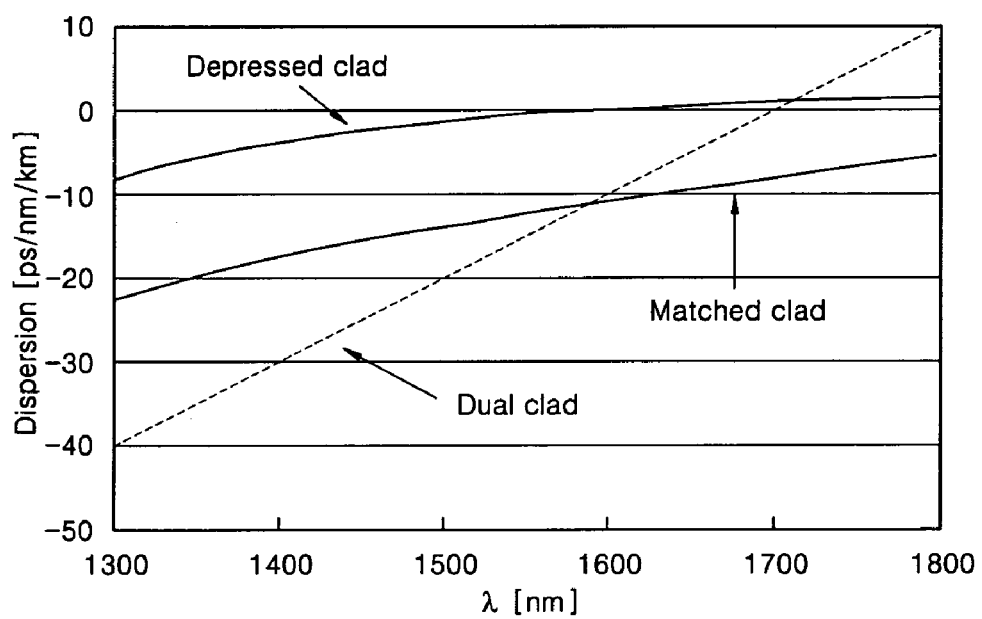
FIG. 13 is a graph that illustrates dispersion as a function of wavelength for the matched-, depressed-, and dual-clad optical fibers of FIGS. 9A through 9C.

FIG. 13 is a graph that illustrates dispersion as a function of the wavelength for the matched-, depressed-, and dual-clad optical fibers of FIGS. 9A through 9C.

Referring to FIG. 13, the optical fiber with depressed clad wholly has a small absolute value of dispersion and a gradual dispersion slope (i.e., small variation in dispersion) as compared to the optical fiber with matched clad. On the other hand, the optical fiber with dual clad has a very sharp dispersion slope. In this regard, adjustment of the refractive index and radius of the depressed clad can provide the zero-dispersion wavelength of 1,590 nm. Therefore, when an optical fiber comprises a rectangular core and a depressed clad, the nonlinear coefficient of the optical fiber is 18 $W^{-1}km^{-1}$ as calculated by the above Equation 1, which is about nine times higher than the nonlinear coefficient of a conventional dispersion-shifted fiber.

To allow the nonlinear coefficient to exceed 20 $W^{-1}km^{-1}$, a separate method is required. For this, in the present invention, a material with a high nonlinear refractive index is added to a core and/or a clad. A refractive index (n) can be calculated from the following Equation 2 when light with intensity of (I) passes through a nonlinear medium. In Equation 2, $n_0$ is a linear refractive index and $n_2$ is a nonlinear refractive index. The $n_2$ can be expressed using a third-order susceptibility ($\phi_{1111}$), like in Equation 3.

$$n = n_0 + n_2 I \quad (2)$$

$$n_2 = \frac{480\pi^2}{n_0^2 c}\Phi_{1_11_1} \quad (3)$$

Figure 14:
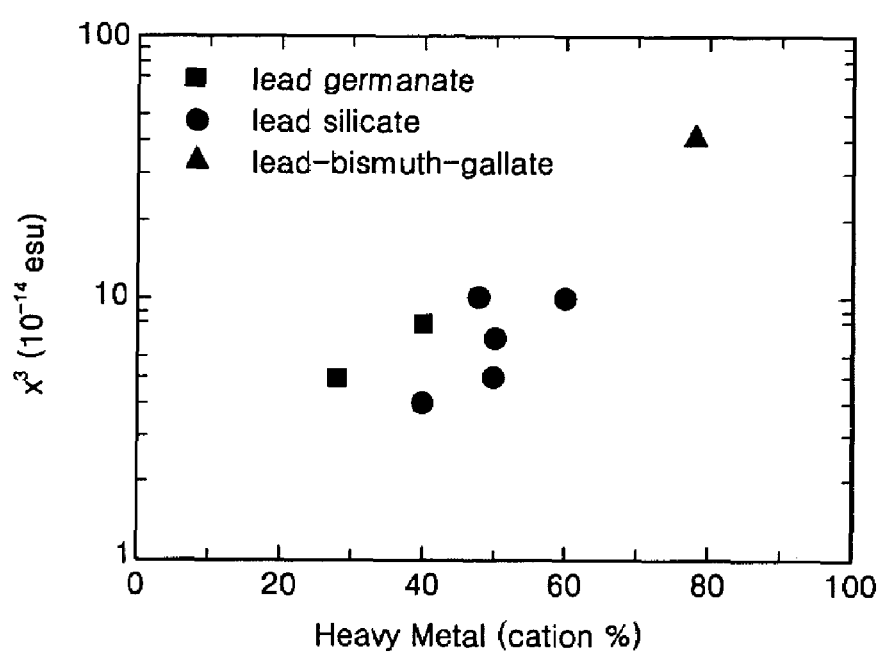
FIG. 14 is a graph that illustrates susceptibility with respect to the concentration of various heavy metals doped on cores of optical fibers.

FIG. 14 is a graph that illustrates susceptibility ($\phi_{1111}$) with respect to the concentration of various heavy metals doped on cores of optical fibers.

Referring to FIG. 14, susceptibility is directly proportional to the concentration of a heavy metal. As the concentration of a heavy metal increases, a nonlinear refractive index ($n_2$) increases. To increase the nonlinear refractive index of an optical fiber, in the present invention, a core and/or a clad are/is doped with a heavy metal such as lead, bismuth, or a mixture thereof.

Figure 15:
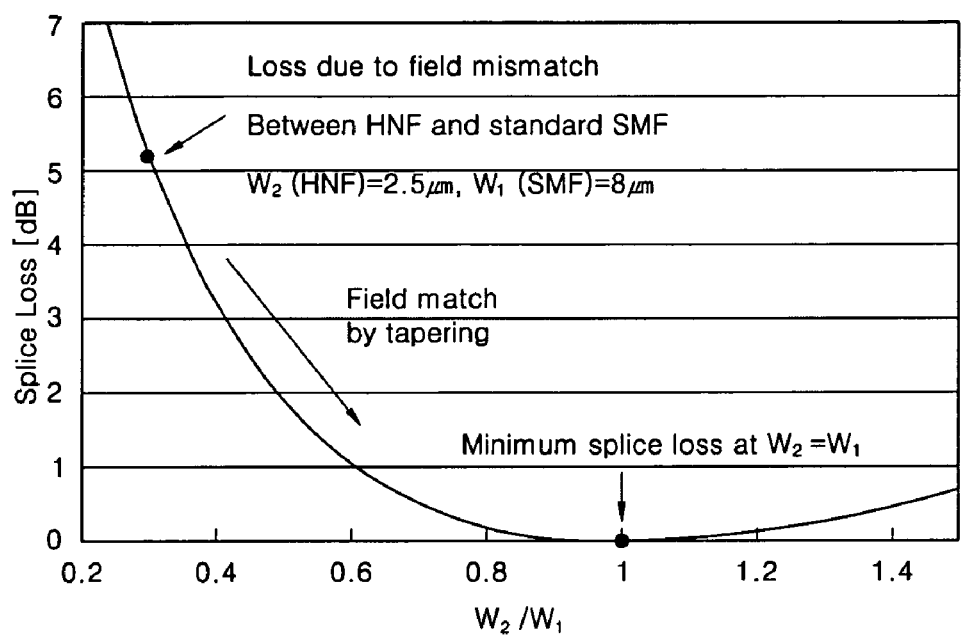
FIG. 15 is a graph that illustrates a splice loss with respect to the relative field diameter of different two optical fibers.

FIG. 15 is a graph that illustrates a splice loss due to the relative field diameter difference between two optical fibers, highly nonlinear fiber (HNF) and conventional single mode fiber (SMF).

Referring to FIG. 15, the two optical fibers have a large splice loss because the HNF has a very small core relative to the conventional SMF. The splice loss because of a mode field diameter difference between the two optical fibers can be reduced by equalizing the mode field diameters of the two optical fibers using a mode converter or tapering. Meanwhile, a optical fiber with depressed clad may undergo a large bending loss because the light energy propagated within the core is easily leaked into the clad due to variation in refractive index by bending. To solve this problem, an optical fiber according to the present invention has a ring structure in an outer clad. Therefore, easy leakage of a light energy into the clad due to variation in refractive index by bending can be reduced.

Figure 16:
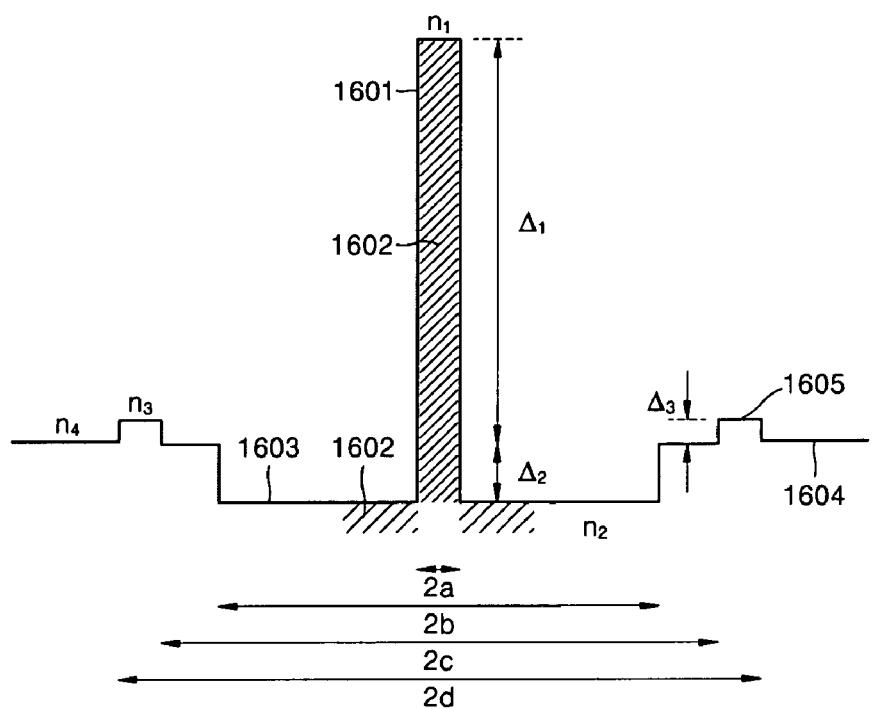
FIG. 16 is a refractive index profile of a dispersion-shifted fiber according to the present invention.

FIG. 16 is a refractive index profile of a dispersion-shifted fiber according to the present invention. The optical fiber satisfies all the above-described characteristics for an OPA.

Here, the radius of a core 1601 is 1.65 μm and a relative refractive index difference ($\Delta_1 = (n_1-n_4)/n_1$) between the core 1601 and an outer clad 1604 is 2%. The core 1601 is doped with a heavy metal 1602 selected from bismuth, lead, and a mixture thereof.

Generally, manufacturing of an optical fiber requires the creation of an optical fiber preform using a modified chemical vapor deposition (MCVD) process. The MCVD process is a process that creates a preform by flowing a dopant gas and oxygen in a quartz glass tube with heating outside the quartz glass tube. At this time, a glass film is deposited inside the quartz glass tube and collapsed to create the preform.

There are limitations on the deposition of the dopant gas inside the quartz glass tube. This is because the use of an excess dopant gas prevents the deposition and the collapse inside the quartz glass tube, which renders the creation of an optical fiber preform difficult. In addition, a maximal refractive index difference that can be obtained by the MCVD is 2% when germanium is used as the dopant gas to increase the refractive index of a core. In this regard, it is preferable to limit a relative refractive index difference ($\Delta_1$) between the core 1601 and the outer clad 1604 to 2% or less.

An inner clad 1603 has a depressed refractive index profile and is doped with the heavy metal 1602 near the core 1601. The radius of the inner clad 1603 is 12 μm and a relative refractive index difference ($\Delta_2 = (n_4-n_2)/n_4$) between it and the outer clad 1604 is 1.2%. The inner clad 1603 is made of carbon tetrafluoride ($CF_4$) or silicon fluoride (SiF) to lower a refractive index. The maximal refractive index difference between the inner clad 1603 made of the above material and the outer clad 1604 is 1.5%. In this regard, it is preferable to set the relative refractive index difference ($\Delta_2$) between the inner clad 1603 and the outer clad 1604 to 1.5% or less.

A ring 1605 with a thickness (d–c) of 3 μm may be further present in the outer clad 1604. A relative refractive index difference ($\Delta_3 = (n_3-n_4)/n_3$) between the ring 1605 and the outer clad 1604 is 0.07%. The ring 1605 serves to reduce a bending loss without large variation in dispersion and an effective area. Therefore, an optical fiber according to the present invention is designed under consideration of the thickness of the ring 1605 and the relative refractive index difference ($\Delta_3$) so that the ring 1605 does not change dispersion and an effective area. Preferably, the thickness (d-c) of the ring 1605 is 0.3 to 0.8 times of the thickness (a) of the core 1601 and the thickness (b-a) of the inner clad 1602 is 6 to 7 times of the thickness of the core 1601.

Figure 17:
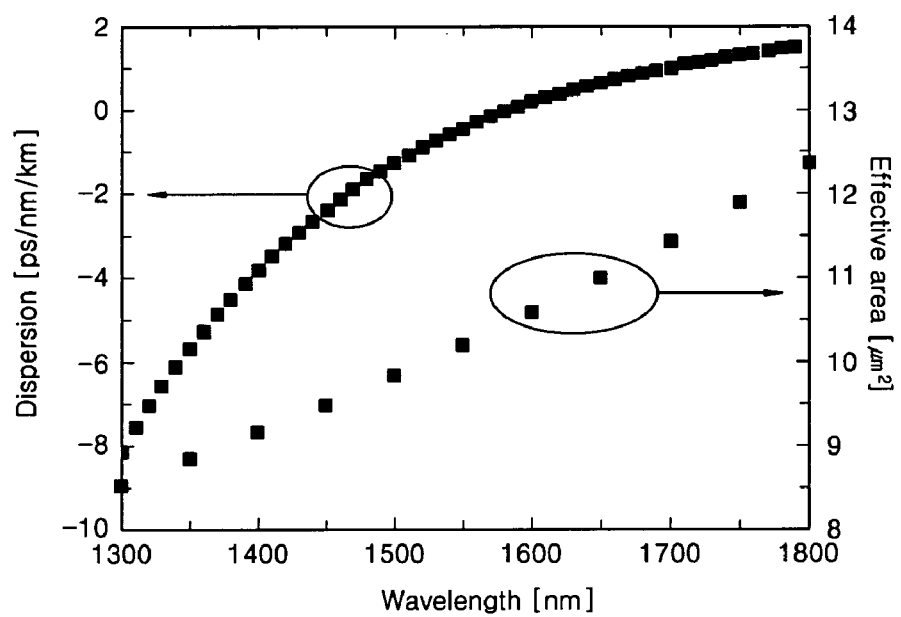
FIG. 17 is a graph that illustrates dispersion and effective area of a dispersion-shifted fiber according to the present invention.

FIG. 17 is a graph that illustrates dispersion and effective area of a dispersion-shifted fiber according to the present invention.

Referring to FIG. 17, a zero dispersion wavelength is 1,590 nm. Dispersion is 0.48 ps/nm/km, a dispersion slope is 0.014 ps/nm²/km, an effective area is 10.18 μm² at a wavelength of 1,550 nm, and a cut-off wavelength is 1,300 nm. The nonlinear coefficient of an optical fiber thus designed is calculated using the above Equation 1. At this time, a 39 cation % lead-containing optical fiber has a nonlinear refractive index of $22 \times 10^{-20}$ m²/W (M. A. Newhouse, et. al, "Enhanced-nonlinearity single-mode lead silicate optical fiber", Opt. Lett., 15(21), 1185–1187(1990)) and a 78 wt % bismuth-containing optical fiber has a nonlinear refractive index of $3.2 \times 10^{-19}$ m²/W (K. Kikuchi, et. al, "Highly-nonlinear Bismuth Oxide-based glass fibers for all-optical signal processing", OFC, ThY6, (2002)). As a result, the dispersion-shifted fiber according to the present invention have a nonlinear coefficient of 88~127 $W^-km^{-1}$, which is about 44–63 times higher than the nonlinear coefficient of a conventional dispersion-shifted fiber.

In summary, a dispersion-shifted fiber with high nonlinear coefficient suitable for an OPA according to the present invention comprises a core with a very small radius and a rectangular refractive index profile (wherein a refractive index is constant regardless of the radius of the core), an inner clad with a depressed refractive index profile, and an outer clad with a ring. The core and the inner clad are doped with a heavy metal.

According to the present invention, a core and a clad has an optimal refractive index profile to decrease an effective area and to provide an appropriate dispersion property. Further, the core and the clad are doped with a heavy metal such as lead and bismuth to higher a nonlinear refractive index. In addition, an optical fiber according to the present invention can reduce a splice loss due to mode field diameter difference between it and a conventional single mode fiber and a bending loss due to a depressed clad structure.

The values of various parameters as described above are theoretical values for obtaining a high gain. Hereinafter, preferred characteristics of an optical fiber according to the present invention will be described in view of various difficulties of an optical fiber manufacturing process and cost-effectiveness.

As described above, an optical fiber for a high gain of OPA must have a high nonlinear coefficient, which requires the reduction of an effective area. The reduction of an effective area requires a large relative refractive index difference between a core and an outer clad and a small core radius. However, a refractive index limitedly increases in formation of an optical fiber perform, thus there is a limitation on the reduction of an effective area.

As the radius of a core decreases, a radius error of an actually manufactured optical fiber increases, which renders the design of a desired optical fiber structure difficult. Further, a core with a excess small radius causes light to escape a core and to leak into a clad. Therefore, it is required that an available effective area is 10 μm² or more according to the practice of an optical fiber manufacturing process. However, there is a disadvantage in that an excess effective area decreases a nonlinear coefficient. In this regard, it is preferable to limit an effective area of an optical fiber of the present invention to 10.5 μm² or less, regarding an error range of 3% based on the above-described theoretical effective area, 10.18 μm².

As described above, the reduction of an effective area requires a decrease of a core radius or an increase of a refractive index, which increases a process burden and creates high errors rates according to various characteristics of optical fibers. In this regard, there may be suggested an alternative to increase a nonlinear coefficient by increasing the content of a heavy metal to be added to a core while slightly increasing the effective area. Therefore, an optical fiber of the present invention may have an effective area of 10 to 30 μm² or less to maintain a nonlinear coefficient of 80 $W^{-1}km^{-1}$ or more.

As described above, an optical fiber for a high gain of OPA must have a high nonlinear coefficient. For this, a core of the optical fiber is doped with a heavy metal.

However, the use of an excess heavy metal prevents the deposition inside a quartz glass tube, which renders the creation of an optical fiber preform difficult. For this reason, there is a limitation on increase of a nonlinear coefficient using a heavy metal. Generally, an optical fiber with a nonlinear coefficient of 88 $W^-km^{-1}$ can have a nonlinear coefficient error of ±9%. In this regard, an optical fiber of the present invention may have a nonlinear coefficient of 80 $W^{-1}km^{-1}$ or more.

A zero-dispersion wavelength serves as a very important factor in selecting an appropriate gain bandwidth of an OPA.

To set a 200 nm wavelength range between 1,490 and 1,690 nm including a C/L band as a gain bandwidth, a zero-dispersion wavelength must be present at 1,590 nm, the center between 1,490 and 1,690 nm. However, the zero-dispersion wavelength can vary according to the gain bandwidth. In this regard, an optical fiber of the present invention may have a zero-dispersion wavelength of 1590±10 nm to have a 200 nm gain bandwidth.

However, as described above, a nonlinear coefficient as high as 80 $W^{-1}km^{-1}$ or more cannot be anticipated at an effective area of 30 $\mu m^2$ or more since there is a limitation on increase of a nonlinear coefficient with an increase in the content of a heavy metal. Also, when a gain bandwidth is within a short- or long-wavelength, there is no need to set a zero-dispersion wavelength to 1590±10 nm. In this regard, a wider zero-dispersion wavelength is necessary for a wider gain bandwidth. Therefore, a zero-dispersion wavelength may be a range from 1,530 to 1,620 nm which is a wavelength range commonly used in optical communication at an effective area of 10 to 30 $\mu m^2$.

As apparent from the above descriptions, a dispersion-shifted fiber for an OPA according to the present invention has a appropriate zero-dispersion wavelength to have wide gain bandwidth, a low dispersion slope, and high nonlinearity. Further, the optical fiber can reduce all losses including a scattering or bending loss, and a splice loss due to a mode field diameter difference between it and a common silica optical fiber. Therefore, an OPA using the dispersion-shifted fiber can have a significant performance enhancement effect.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dispersion-shifted fiber for an optical parametric amplifier, which comprises a core, an inner clad, and an outer clad, and has a nonlinear coefficient of 80 $W^{-1}$ $km^{-1}$ or more, and a zero-dispersion wavelength of 1,530 to 1,620 nm wherein the core has a constant refractive index regardless of the radius of the core.

2. The dispersion-shifted fiber of claim 1, wherein the fiber has an effective area of 10.5 $\mu m^2$ or less.

3. The dispersion-shifted fiber of claim 1, wherein the core is doped with a heavy metal selected from bismuth (Bi), lead (Pb), and a mixture thereof.

4. The dispersion-shifted fiber of claim 3, wherein the core is doped with a Pb of 35 cation % or more.

5. The dispersion-shifted fiber of claim 3, wherein the core is doped with a Bi of 80 cation % or more.

6. The dispersion-shifted fiber of claim 5, wherein the heavy metal doped on the inner clad is used in a less amount than the heavy metal doped on the core.

7. The dispersion-shifted fiber of claim 1, wherein the inner clad is doped with a heavy metal selected from Bi, Pb, and a mixture thereof.

8. The dispersion-shifted fiber of claim 2, wherein the outer clad further comprises a ring.

9. The dispersion-shifted fiber of claim 8, wherein a relative refractive index difference between the core and the outer clad is 2% or less, and a relative refractive index difference between the inner clad and the outer clad is 1.5% or less and is higher than a relative refractive index difference between the ring and the outer clad.

10. The dispersion-shifted fiber of claim 8, wherein a thickness of the ring is 0.3–0.8 times of a thickness of the core and a thickness of the inner clad is 6–7 times of the thickness of the core.

* * * * *